United States Patent
Howes et al.

(10) Patent No.: US 7,002,259 B2
(45) Date of Patent: Feb. 21, 2006

(54) METHOD OF CONTROLLING ELECTRICAL ROTATING MACHINES CONNECTED TO A COMMON SHAFT

(75) Inventors: Lawrence H. Howes, Santa Barbara, CA (US); Amir S. Mikhail, Santa Barbara, CA (US); Geoff F. Deane, Santa Barbara, CA (US)

(73) Assignee: Clipper Windpower Technology, Inc., Carpenteria, CA (US)

( * ) Notice: Subject to any disclaimer, the term of this patent is extended or adjusted under 35 U.S.C. 154(b) by 556 days.

(21) Appl. No.: 10/224,108

(22) Filed: Aug. 20, 2002

(65) Prior Publication Data

US 2003/0057703 A1 Mar. 27, 2003

Related U.S. Application Data

(60) Provisional application No. 60/313,725, filed on Aug. 21, 2001.

(51) Int. Cl.
*H02P 9/04* (2006.01)

(52) U.S. Cl. .............. 290/4 C; 290/6; 290/7; 322/10

(58) Field of Classification Search ............... 290/1 C, 290/43, 54, 44, 55; 310/75 R; 322/10
See application file for complete search history.

(56) References Cited

U.S. PATENT DOCUMENTS

| | | | | |
|---|---|---|---|---|
| 4,780,659 A | * | 10/1988 | Bansal et al. | 322/58 |
| 5,146,096 A | * | 9/1992 | McConachy | 290/44 |
| 5,973,481 A | * | 10/1999 | Thompson et al. | 322/7 |
| 5,990,590 A | * | 11/1999 | Roesel et al. | 310/113 |
| 6,118,194 A | * | 9/2000 | Kawamura | 310/75 R |
| 6,653,744 B1 | * | 11/2003 | Stricker | 290/6 |
| 6,692,222 B1 | * | 2/2004 | Tsuru et al. | 415/14 |
| 6,720,670 B1 | * | 4/2004 | Makino et al. | 290/55 |
| 6,731,017 B1 | * | 5/2004 | Mikhall et al. | 290/1 C |

\* cited by examiner

*Primary Examiner*—Nicholas Ponomarenko
(74) *Attorney, Agent, or Firm*—Owen L. Lamb (57) ABSTRACT

A controller for high torque, low RPM wind turbines and ocean current turbines. The turbine consists of a large, input power shaft-mounted, rotating bull-gear with stationary powertrains mounted around its periphery. The gear teeth on the bull-gear rotate past the teeth on pinions, causing the pinions to turn and delivering power to each smaller powertrain. A controller regulates torque experienced by each powertrain to assure that torques are balanced between generators at any given system load. The control method comprises the programmatically continuously looping steps of measuring a system parameter to be controlled, such as torque and/or speed, selecting the optimal number of generators to be connected/disconnected to a utility line, incrementally connecting or disconnecting generators to achieve the point of optimal performance, measuring the parameters, such as current and/or voltage, of the connected generators and adjusting the generator parameters to fine tune the system for optimal performance.

6 Claims, 6 Drawing Sheets

METHOD OF CONTROLLING ELECTRICAL ROTATING MACHINES CONNECTED TO A COMMON SHAFT

CROSS-REFERENCE TO RELATED APPLICATIONS

This application is a continuation-in-part of US Provisional Patent Application No. 60/313,725 Filed: Aug. 21, 2001, and is related to U.S. Pat. No. 6,731,017 entitled "Improved Distributed Powertrain That Increases Electric Power Generator Density" filed Aug. 7, 2002, and granted May 4, 2004, both of which are incorporated herein by reference.

BACKGROUND OF THE INVENTION

1. Field of the Invention

This invention relates to electrical rotating machines connected to a common shaft and more particularly to a method of controlling a number of mechanically coupled electrical rotating machines such as wind turbines and ocean current turbines.

2. Description of the Prior Art

Many electric power-generating devices, such as wind turbines and ocean current turbines, benefit from economies of scale, yielding lower costs for generated electricity with larger power generation per unit. This increase in power is often accompanied by a reduction in rotational velocity of the power-input shaft, resulting in a large increase in torque. Because electric generators require rotational velocities tens to hundreds of times greater than the rotational velocity of the input shaft, a speed-increasing gearbox is often applied between the power-input shaft and the generator.

Dehlsen et al U.S. Pat. No. 6,304,002 discloses a Distributed Generation Drivetrain (DGD powertrain) for wind turbines and ocean current turbines which consists of a large, input power shaft-mounted, rotating bull-gear with stationary smaller powertrains mounted around its periphery, the shafts of which engage the bull gear by pinions. The gear teeth on the bull-gear rotate past the teeth on the pinions, causing the pinions to turn and deliver power to each smaller powertrain. Alternatively, powertrains are attached in a spindle around the perimeter of a main power input drive shaft, and rotate as the shaft rotates. The input drive shaft to each of the smaller powertrain gearboxes is fitted with a pinion. As the main power input shaft turns, the smaller powertrains, gearboxes and pinions rotate, moving the pinions around the interior of a stationary ring gear. Reduction and distribution of torque is similar to the rotating bull-gear powertrain. In the bull-gear configuration, each smaller powertrain is stationary, reducing stress caused by rotation.

In the above-identified U.S. Pat. No. 6,731,017 discloses an improved distributed powertrain that increases electric power generator density by locating a plurality of output shafts around a bull gear which is coupled to the main input shaft. A number of generators are each coupled to a respective one of the output shafts, such that each one of the output shafts drives a generator. A number of intermediate gears are located around a perimeter of the bull gear, alternating half of the intermediate gears on one side of the bull gear and half on an opposite side of the bull gear. Each one of the intermediate gears is pressure fitted to an intermediate pinion with teeth that engage the bull gear teeth. Each one of the output shafts has two pinions that engage two intermediate gears, one on one side of the bull gear and one on an opposite side of the bull gear.

The power and control system for the powertrain must take the mechanical output from the individual second-stage gearboxes and produce 3-phase electrical power to a utility line. To perform successfully, this control system must assure a uniform torque load distribution between generators, softly connect and disconnect with the utility line, seek maximum operating efficiency, monitor and provide protection for mechanical and electrical parameters operating out of specification, and accommodate input from external systems and operators.

Therefore, besides generators, the power conversion system requires an appropriate controller to manage these tasks. In patent application publication U.S. 2002/0014773 A1, filed Jul. 31, 2001, and published Feb. 7, 2002 (now U.S. Pat. No. 6,653,744) a control method is described that regulates torque experienced by each generator to assure that torques are balanced between generators at any given system load. The regulating includes controlling local voltage at each generator by a transformer configured as a reactor, in which coils of the transformers are wired in parallel and are actively modulated with a silicon controlled rectifier (SCR), a solid-state, switching device. Each generator is connected to a respective primary coil of a transformer and a respective secondary coil is connected to an SCR.

It is desirable that a Distributed Generation Drivetrain (DGD) powertrain having multiple generators be able to match the loads between generators evenly, avoiding "power hogging." In the event of hogging, more power and more torque loads are passed through one pinion-bull gear interface than the others, endangering the gearing and the electrical equipment in the overloaded sub-powertrain.

It is also desirable for the control system for a wind (or ocean current) turbine utilizing the DGD powertrain to provide for variable speed operation when wind or water flow is sufficient to produce power, and the ability to provide for variable speed gust mitigation when peak power output of the turbine is reached.

Additionally, it is desirable for a DGD system having five or more generators to provide for very close load sharing between generators, and to allow for incremental engagement of generators in a way that maximizes system efficiency.

SUMMARY OF THE INVENTION

Briefly, the invention is concerned with a method of controlling electrical rotating machines (motors or generators) connected to a common shaft. The method comprises the continuously looping steps of measuring a system parameter to be controlled, such as torque and/or speed, selecting the optimal number of machines to be connected/disconnected to a utility line, incrementally connecting or disconnecting machines to achieve the point of optimal performance, measuring the parameters, such as current and/or voltage, of the connected machines and adjusting the machine parameters to fine tune the system for optimal performance.

The invention has the advantage that a powertrain having multiple generators is able to match the loads between generators evenly, avoiding "power hogging" that would endanger the gearing and the electrical equipment in an overloaded sub-powertrain.

The invention has the advantage that the control method provides variable speed operation when wind or water flow is sufficient to produce power, and provides for variable speed gust mitigation when peak power output of the turbine is reached.

The invention has the advantage that for a DGD system having five or more generators the control method provides for very close load sharing between generators, and provides incremental engagement of generators in a way that maximizes system efficiency.

BRIEF DESCRIPTION OF THE DRAWINGS

The invention will be described in detail with reference to the drawings in which.

DESCRIPTION OF THE PREFERRED EMBODIMENTS

This invention applies principally to wind and ocean current turbine generators employing the Distributed Generation Drivetrain (DGD) powertrain described in U.S. Pat. No. 6,304,002 and using a number of rotating electrical machines, either motors or generators. Preferably the number of electrical machines is five or more. The large number of machines is significant because it reduces the power rating of any single electrical machine to below 20% of the total system rating, allowing for enhanced use of the controls taught by this invention.

Figure 4:
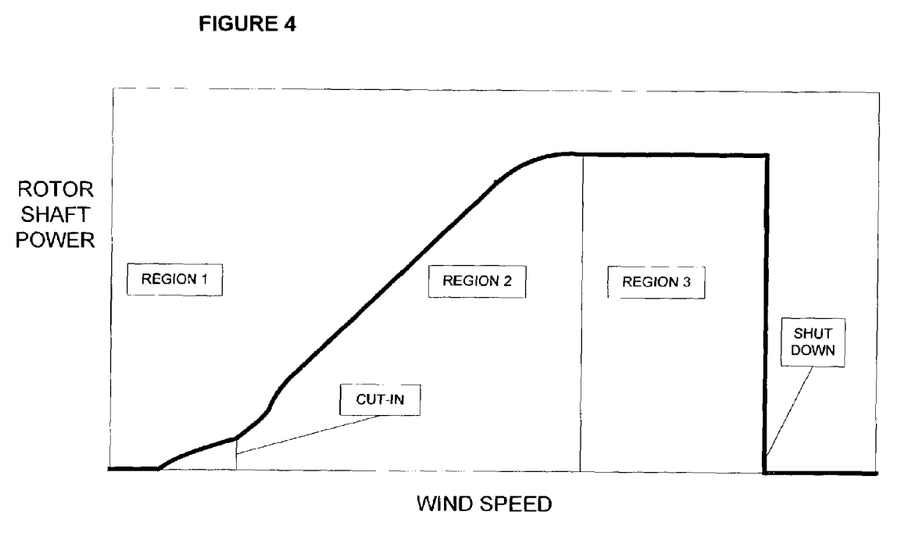
FIG. 4 is a graph that illustrates the three turbine operating regions of the present invention.

As illustrated by the chart of FIG. 4, for a wind turbine system, there are three principal wind speed regions. The turbine is designed to operate differently in each region. In very low wind speeds (below approximately 3–5 m/s), Region 1 operation controls do not allow the turbine to generate any electricity, as the wind energy resource is not sufficient. As winds increase into Region 2 operation, the rotor begins to produce power. It is preferable to have a wind turbine that can allow the rotor to increase its rotational rate in this region, as the optimal rotational rate of the turbine blades for power capture is closely related to rotor rotational rate. Turbines that are capable of changing rotor rotational rate are commonly referred to as "Variable Speed Turbines." As the wind speed further increases into Region 3, the peak power output of the turbine is reached and the turbine rotors shed power. This is typically done through one of two methods: use of stall-regulated airfoils, or use of variable pitch rotor blades. The ability to change the rate of rotation of the rotor in this region is highly desirable as a means of mitigating intermittent gust loads. When the rotor is allowed to increase speed by up to 10% for short periods of time, gust energy is stored as inertia in the rotor and is not directly passed into the gearbox and generator. Peak gust torque spikes transmitted to the gearbox are reduced by more than 80% using this method. In Region 3, when wind speeds exceed maximum operating design conditions for the turbine, the turbine shuts down and control returns to the idle state, Region 1.

Incremental engagement of multiple generators on a DGD system allows for some of the generators to be off-line when the wind is not adequate to reach the system rated power. In addition, because the efficiency of generators tends to increase with the load applied, up to the equipment's design load, it is advantageous to have generators operating near their rated power for as much of their operational range as possible. Typically, highly efficient generators reach 90% of their peak efficiency at 25% load. Therefore, in order to have the efficiency gains be appreciable, five or more generators are desirable; the larger the number of generators, the higher the net system efficiency gains.

State Diagram

In describing the method of operation of the rotor, rotor state is divided into three distinct states for each of the three operating regions of flow speed, shown in FIG. 4. Region 1 spans low velocities below turbine cut-in. Region 2 spans transition velocities during which the rotor speed may vary, and power increases steadily with increasing wind speed. Region 3 spans higher velocities during which the speed is varied to limit loads while power production continues to increase. When Region 3 reaches extreme velocities all generators are disconnected, and rotor blades are feathered to halt rotation and reduce loads.

Figure 1:
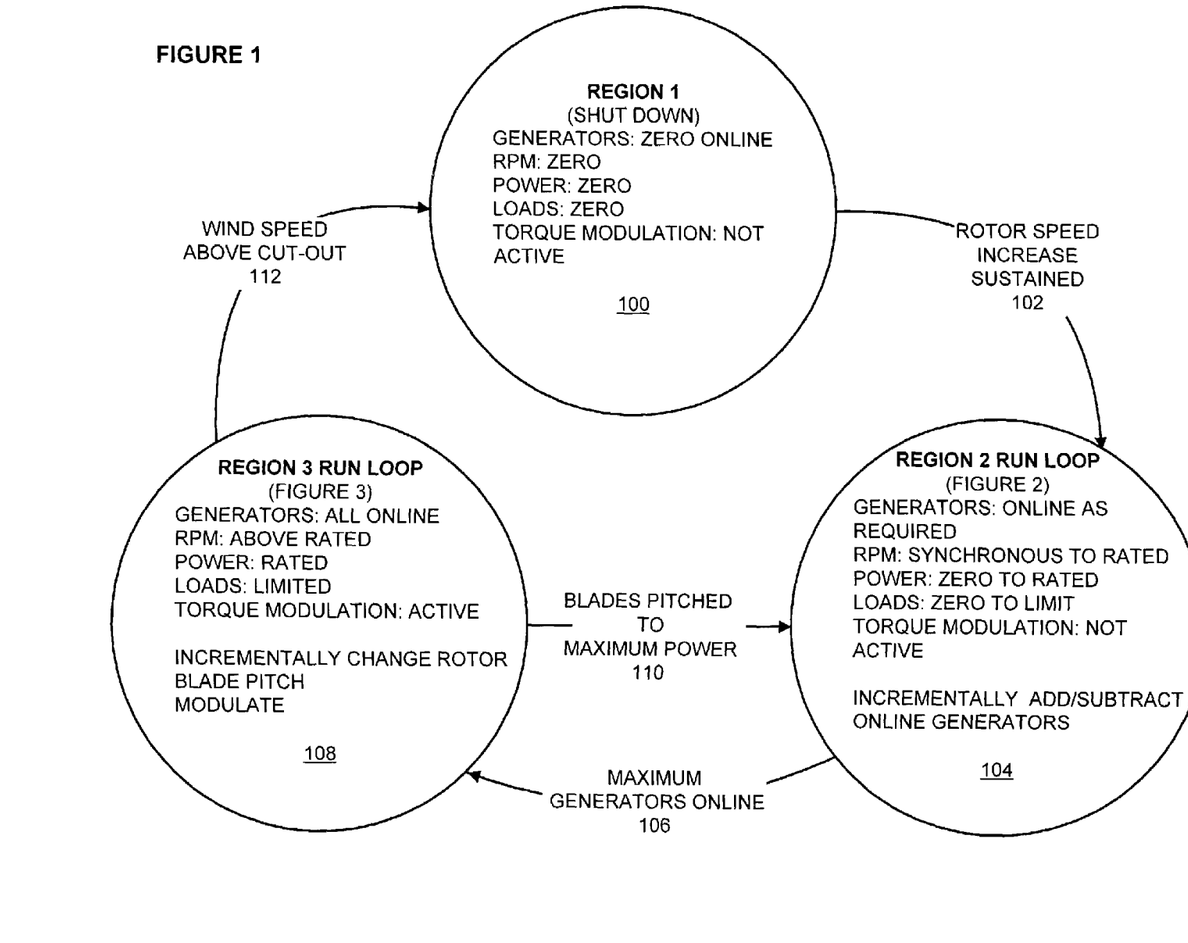
FIG. 1 is a state diagram for regions 1–3 turbine control.

Refer to FIG. 1, which is a state diagram of the control method of the invention. Three states, 100, 104, 108, are shown corresponding to Regions 1, 2, and 3, respectively. The idle state corresponds to region 1 on the graph of FIG. 4, which spans low velocities below turbine cut-in.

In region 1 power generation is shut down. There are zero generators online, the rpm is zero, power is zero, loads are zero and the torque modulation is not active. When a rotor speed increase is sustained, the transition (102) is made from Region 1 to Region 2 and the state transfers to the Region 2 Run Loop 104.

Figure 2A:
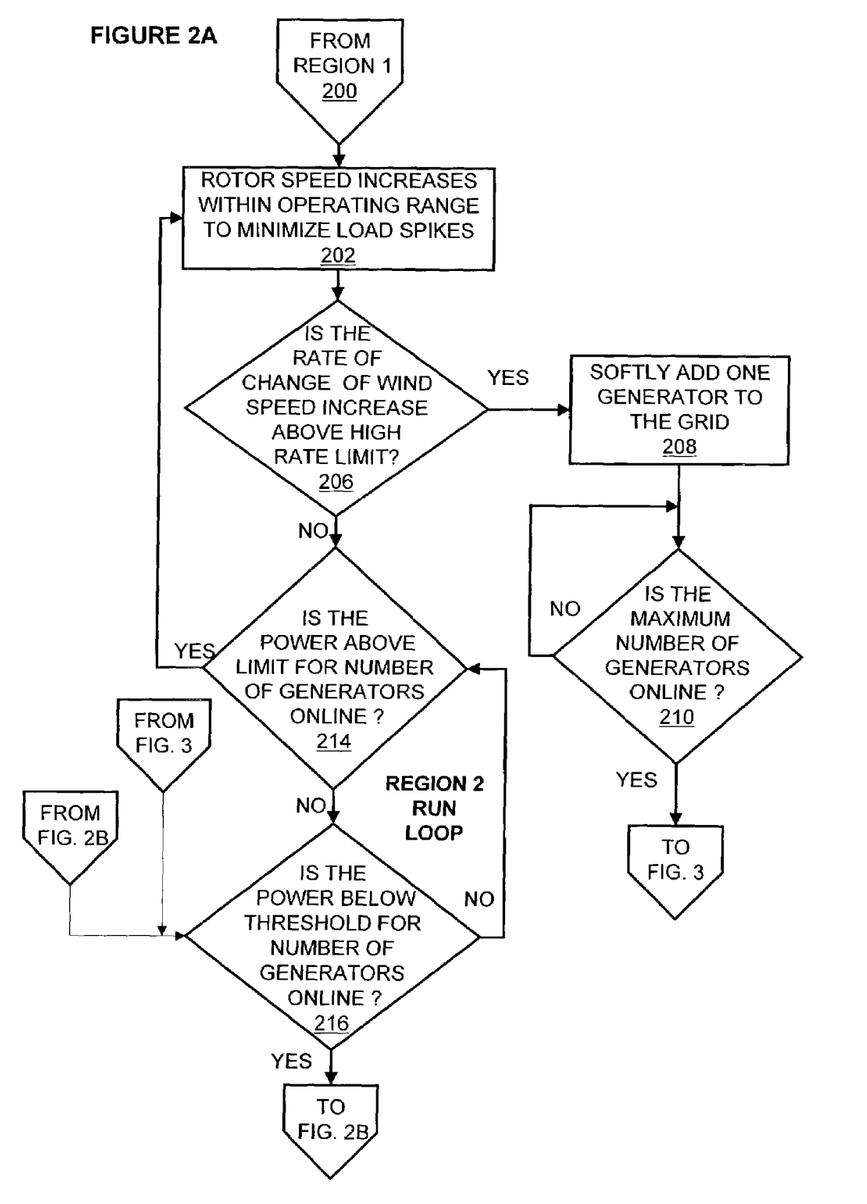
FIGS. 2A and 2B comprise a chart for region 2 turbine control.
Figure 2B:
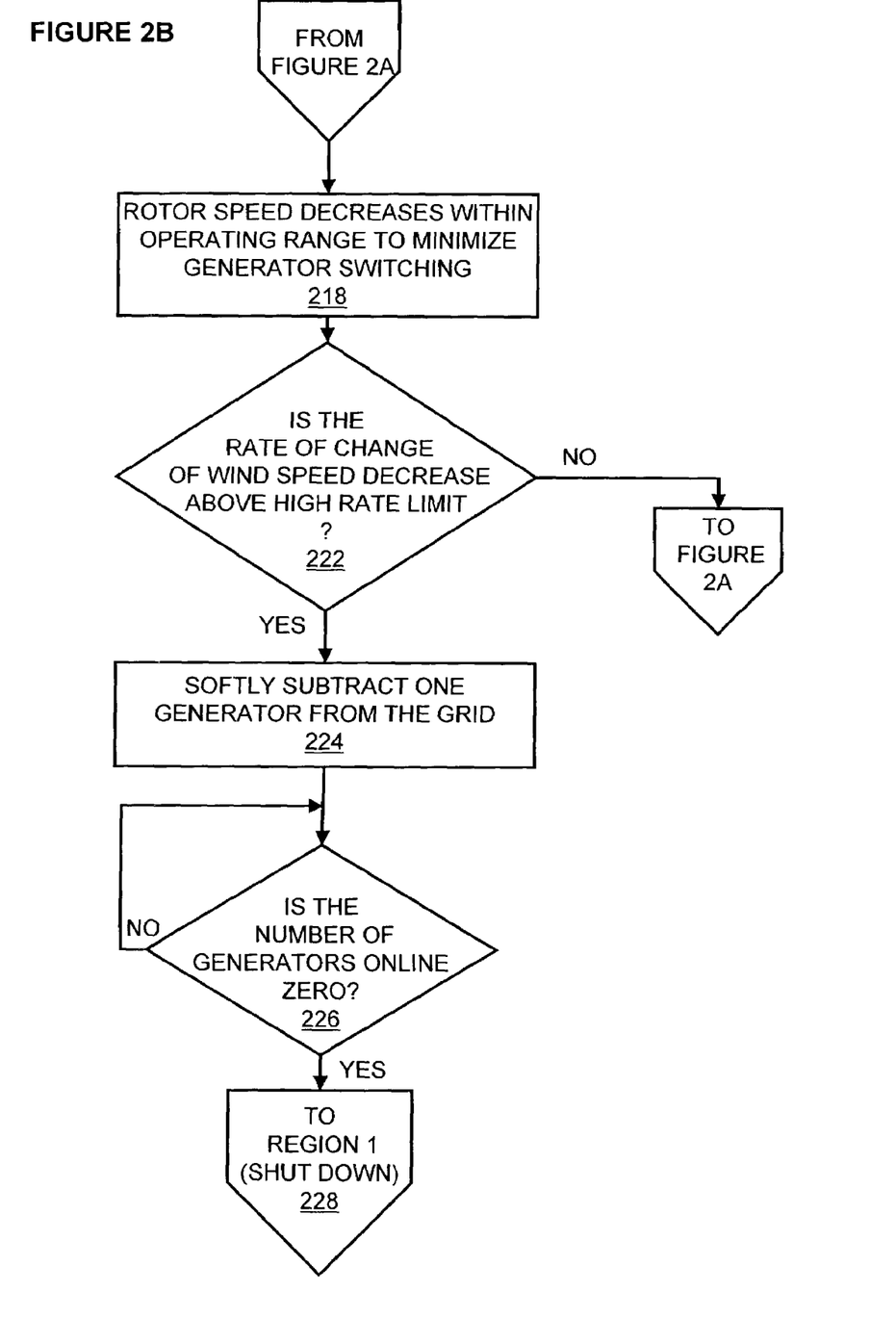

Region 2 spans transition velocities during which rotor speed may vary, and power increases steadily with increasing wind speed. The region 2 run loop 104 is shown in detail in FIGS. 2A and 2B. The region 2 run loop state is there are generators online as required, the rpm is synchronous to rated, power is zero to rated, loads are zero to limit and the torque modulation is not active. The controls incrementally add/subtract online generators. When the maximum number of generators are online the transition (106) is made from Region 2 to Region 3 and the state transfers to the Region 3 Run Loop 108. Region 3 spans higher velocities during which the rotor speed is varied to limit loads while power production continues to increase. The region 3 run loop is shown in detail in FIG. 3. The region 3 run loop state is all generators are online, the rpm is above rated, power is rated, loads are limited and the torque modulation is active. The controls incrementally change rotor blade pitch and modulate torque. When the rotor blades are pitched to maximum power the state returns (110) to Region 2 run loop 104. When the wind speed is above cutout the state moves (112) to Region 1, the idle state (100).

Full Load Incremental Engagement with Variable Speed

Incremental engagement is a achieved by enabling the electrical connection of individual distributed gearbox variable speed generators to the power grid in proportion to the amount of wind energy presently available at the turbine. The number of generators to be connected is equal to the power available divided by the full load rating of an individual generator. For example, if 500 kw was available from the wind, four 125 kW generators would be connected (500/125)=4. Available power in excess of 500 but less than 625 kW is then captured by adding on line and then proportionally controlling the power output of a fifth generator. If the available power is still increasing, this incremental engagement process is continued until the turbine rated power output is reached, and all available generators are online. If the wind power is decreasing, the process is reversed, until no generators are online, and the turbine is operating in region 1. At all times, during operation in region 2, the control algorithm will add or subtract generators in a manner which will maintain the generators and turbine within the optimum efficiency operating range. In region 3, the aggregate of generators is allowed to speed up until either the wind velocity reduces, or the rotor blade pitch is altered to reduce captured wind energy.

Proportional Load Incremental Engagement

This control system is for types of generators, which have maximum efficiency at less than full load, such, as but not limited to permanent magnet types. The control system adds or subtracts generators until the total number of generators on line is equal to the number required to match the input power as if each of the generators were operating at full load plus the proper number of generators to provide the excess capacity required to operate the generators which are online at the optimum load level (something less than 100%).

Fixed Speed Incremental Engagement

Fixed speed dynamic connection is a achieved by enabling the electrical connection of individual distributed gearbox squirrel cage rotor induction or syncronous generators to the power grid in proportion to the amount of wind energy presently available at the turbine. The number of generators to be connected is equal to the power available divided by the full load rating of an individual generator. For example, if 500 kw was available from the wind, four 125 kW generators are connected (500/125)=4. Available power in excess of 500 but less than 625 kW is then captured by adding a fifth generator on line and then proportionally controlling the power output of the fifth generator. If the available power is still increasing, this incremental engagement process is continued until the turbine rated power output is reached, and all available generators are online. If the wind power is decreasing, the process is reversed, until no generators are online, and the turbine is operating in region 1. At all times, during operation in region 2, the control algorithm adds or subtracts generators in a manner which will maintain the generators and turbine within the optimum operating range.

Variable Speed Incremental Engagement

Variable-speed dynamic connection is a achieved by enabling the electrical connection of individual distributed gearbox wound rotor induction generators to the power grid in proportion to the amount of wind energy presently available at the turbine. In addition, generator pole counts are selected based on the optimum speed. Wound rotor generators are fed by electronic converters to alter the sync speed. The control system alters the frequency of the rotor power to best match the wind speed. The number of generators to be connected is equal to the power available divided by the full load rating of an individual generator. For example, if 500 kw was available from the wind, four 125 kW generators are connected (500/125). Available power in excess of 500 but less than 625 kW is then captured by adding a fifth generator on line and then proportionally controlling the power output of the fifth generator. If the available power is still increasing, this incremental engagement process is continued until the turbine rated power output is reached, and all available generators are online. If the wind power is decreasing, the process is reversed, until no generators are online, and the turbine is operating in region 1. At all times, during operation in region 2, the control algorithm will add or subtract generators in a manner which will maintain the generators and turbine within the optimum operating range.

Benefits To Efficiency and Power Quality

Induction machines can be controlled by varying the applied stator voltage. Stator voltage modulation can be used to improve efficiency at partial (less than full rated) load of the machine. This property of induction machines is utilized in the DGD control design to minimize EMI, and to maximize turbine efficiency. At any given time, most of the generators connected will be at full rated load (maximum stator voltage, maximum efficiency, best power quality), and/or a minimum number of generators will be at partial load with reduced stator voltage. As the number of generators online increases, the generator, which is modulated, is a smaller fraction of the total and the power quality increases.

Method of Turbine Control

Figure 3:
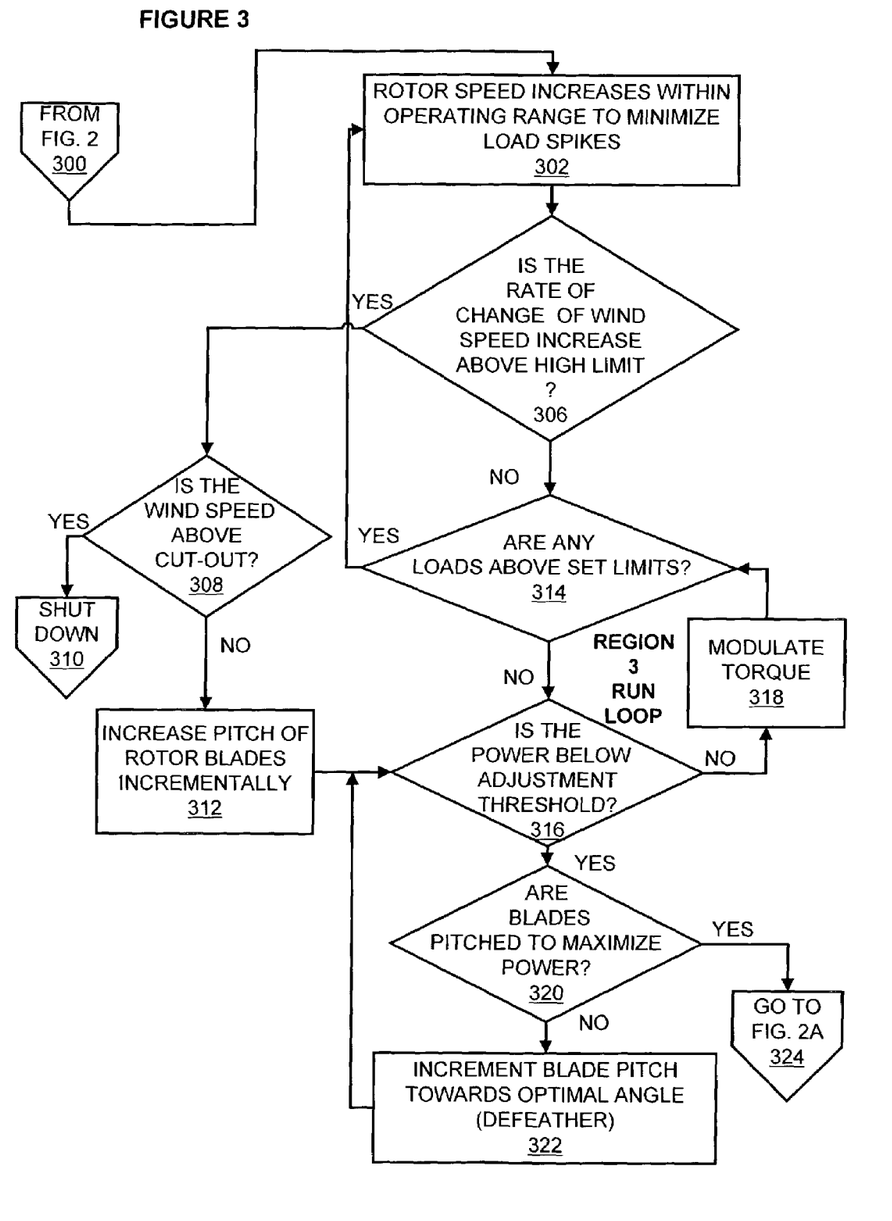
FIG. 3 is a flow chart for region 3 turbine control.

Refer to FIG. 2 which is a program flow chart for region 2 run loop turbine control and to FIG. 3 which is a program flow chart for region 3 run loop turbine control.

In FIG. 2, the flow begins from region 1 (shut down) block 200. As region 2 is entered, the rotor speed increases within an operating range to minimize load spikes, block 202. A test is made at block 206 to determine if the rate of increase of wind speed/load is above the high limit for the number of generators online If yes, then one generator is added to grid, block 208. When the number of generators reaches the maximum allowed online, block 210, the flow proceeds to FIG. 3, (region 3) at block 212.

If the result is no from the test made at block 206 to determine if the wind speed/load increase is sustained, then the flow enters the Region 2 Run Loop comprised of blocks 214, 216. At block 214 a test is made to determine if the power is above limit for number of generators online. If yes, the flow returns out of the loop to block 202. If no, a test is made to determine if the power is below the threshold for the number of generators currently on line, block 216. If no, the flow loops back to block 214. If yes, the flow proceeds to block 218. The rotor speed decreases within operating range to minimize generator switching. At block 220, A test is made at block 206 to determine if the rate of decrease of wind speed/load is above the high limit for the number of generators online. If yes, then one generator is subtracted from grid, at block 224. A test is made at block 226 to determine if the number of generators online is zero. If yes, then the flow proceeds to region 1 (shut down) 228.

In FIG. 3, the flow begins at block 300 from region 2. As region 3 is entered, the rotor speed increases within an operating range to minimize load spikes, block 302. A delay is imposed at block 304 to pause to allow the speed increase to subside. A test is made at block 306 to determine if the wind speed/load increase is sustained. If yes, then a test is made to determine if the wind speed is above cut-out, block 308. If yes, the flow returns via block 310 to region 1 (shut down). If the test made at block 306 to determine if the wind speed/load increase is sustained is no, the flow proceeds to block 312. The rotor blade pitch is increased incrementally and the flow enters the Region 3 Run Loop described below.

If the test made at block 306 to determine if the wind speed/load increase is sustained is negative, the flow enters the Region 3 Run Loop comprised of blocks 314, 316. At block 314 a test is made to determine if there are any loads above set limits. If yes, the flow returns out of the loop to block 302. If no, a test is made to determine if the power is below the threshold for the number of generators currently on line, block 316. If no, the flow loops back through Modulate Torque block 318 to block 314. In the Modulate Torque block 318 an induction machine can be controlled, for example by well-known methods such as by varying the applied stator voltage. Stator voltage modulation can be used to improve efficiency at partial (less than full rated) load of the machine.

If the test made to determine if the power is below the threshold for the number of generators currently on line, block 316, is yes, the flow proceeds to block 320. A test is made at block 320 to determine if the blades are pitched to maximum power. If no, then the blade pitch is incremented towards optimal angle (defeathered), at block 322. If yes, the blades are pitched to maximum power, then the flow via block 324 returns to region 2 FIG. 2A.

Figure 5:
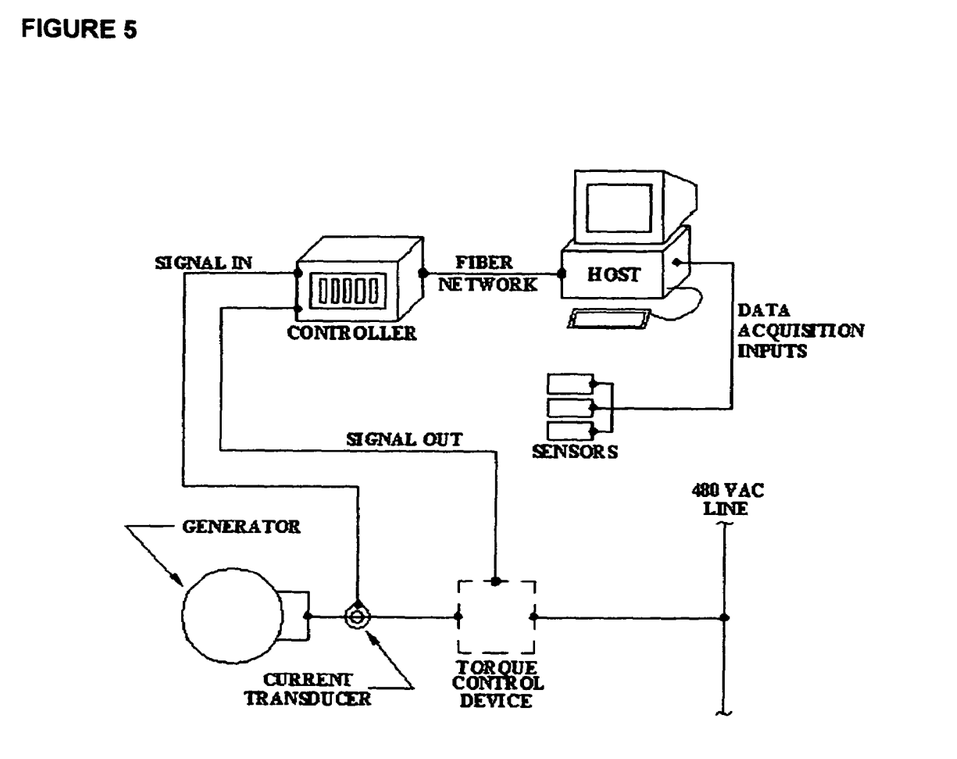
FIG. 5 is a schematic view of a prior art distributed powertrain control system.

Refer to FIG. 5, which is a schematic view of a prior art distributed powertrain control system. The apparatus, via a torque-dividing gearbox, distributes a high input torque of a rotor between multiple powertrains, each consisting of a smaller conventional torque-reducing gearbox and generator. The sum of the power producing capacities of the generators is equal to the maximum power delivered by the power-input shaft, and is equivalent to the power produced by a single generator in a conventional system. This apparatus is referred to herein as a distributed generation drivetrain or DGD.

The prior art control system design incorporates an embedded, real time controller orchestrating control tasks with a host computer linked to it via a high-speed network. The host acts as the data-logging device and serves as the user interface, thus freeing the controller to attend to time-critical control functions without distraction. The host stores dynamic performance data to disk while its keyboard, mouse and display provide the operator with real-time status and the ability to initiate commands to the controller. When installed on a wind or ocean current turbine, this control system is integrated into the turbine's controller.

In the prior art, induction generators were identified as a desirable generator style for use as the mechanical-electrical power conversion on the DGD. Induction units were selected due to their low cost and suitability in a wind turbine loads environment For example, a 200 kW DGD system consisting of five, 40 kW generators is presented in the prior art. These five generators are configured in parallel on a 480 Volt AC circuit. Arranged as such, each generator operates at 480 Volts (nominally) and the current from each sums to produce the total current output. If the torques are balanced the current output from each generator is equal, making the DGD's total current equal to five times the output of a single generator resulting on a total power output of 200 kW. Ultimately the existence of these five generators is transparent to the line as it sees only a single, three-phase output.

While the invention has been particularly shown and described with reference to preferred embodiments thereof, it will be understood by those skilled in the art that the foregoing and other changes in form and detail may be made therein without departing from the scope of the invention.

What is claimed is:

1. A method of controlling a number of mechanically coupled electrical generators connected to a common rotor of a wind turbine, comprising:

testing (at block 206) to determine if a rate of increase of wind speed is above a high rate limit for a number of generators connected online to a utility line;

adding (at block 208) one generator to said utility line, upon a condition that said rate of increase of wind speed/load is determined to be above said high limit for said number of generators online;

determining (at block 210) if a maximum number of generators are connected to said utility line; and, maintaining a region 3 run loop by modulating torque (at block 318), upon conditions that (1) said maximum number of generators are connected to said utility line (block 210), (2) no loads are above set limits (block 314), and (3) power is not below an adjustment threshold (block 316).

2. The method of claim 1 wherein said wind turbine includes variable pitch rotor blades, said method further comprising:

maintaining said region 3 run loop by increasing pitch of said rotor blades (at block 312), upon conditions that (1) said maximum number of generators are connected to said utility line (block 210), (2) loads are above set limits (block 314), and (3) wind speed is determined to not be above cut-out (block 308).

3. The method of claim 1 wherein a number of generators are online, said method further comprising:

testing (at block 222) to determine if a rate of decrease of wind speed is above a high rate limit for said number of generators connected online to a utility line;

maintaining a region 2 run loop, upon conditions that (1) power is not above limit for said number of generators online (block 214), and (2) power is not below threshold for said number of generators online (block 216); and, subtracting (at block 224) one generator from said utility line, upon conditions that (1) power is below threshold for said number of generators online (block 216), and (2) said rate of wind speed decrease is determined to be above said high rate limit for said number of generators online (block 222).

4. The method of claim 3 further comprising:

causing said turbine to shutdown (block 228) upon a condition that said subtracting step (at block 224) reduces the number of generators online to zero (block 226).

5. The method of claim 3 further comprising:

causing said turbine to shutdown (block 310) upon a condition that said wind speed is determined to be above cut-out (block 308).

6. The method of claim 1 wherein said wind turbine includes variable pitch rotor blades, said method further comprising:

incrementing pitch of said rotor blades towards optimal angle (at block 322), upon conditions that (1) power is below adjustment threshold (block 316), and (2) rotor blades are not pitched to maximize power (block 320).

* * * * *